United States Patent
Paila et al.

(10) Patent No.: US 8,125,945 B2
(45) Date of Patent: Feb. 28, 2012

(54) DATACAST SERVICES

(75) Inventors: Toni Paila, Dergeby (FI); Kalle Rindell, Turku (FI)

(73) Assignee: Nokia Corporation, Espoo (FI)

( * ) Notice: Subject to any disclaimer, the term of this patent is extended or adjusted under 35 U.S.C. 154(b) by 716 days.

(21) Appl. No.: 10/576,899

(22) PCT Filed: Nov. 10, 2004

(86) PCT No.: PCT/IB2004/052366
§ 371 (c)(1),
(2), (4) Date: Apr. 19, 2006

(87) PCT Pub. No.: WO2005/050880
PCT Pub. Date: Jun. 2, 2005

(65) Prior Publication Data
US 2007/0072579 A1    Mar. 29, 2007

(30) Foreign Application Priority Data
Nov. 18, 2003   (GB) .................................. 0326835.6

(51) Int. Cl.
*H04W 7/216* (2006.01)
(52) U.S. Cl. .................... 370/329; 455/343.1; 455/343.4
(58) Field of Classification Search .................. 370/329, 370/314; 455/343.1–343.4; 713/300, 323, 713/320, 324
See application file for complete search history.

(56) References Cited

U.S. PATENT DOCUMENTS

| | | | |
|---|---|---|---|
| 6,192,230 B1 * | 2/2001 | van Bokhorst et al. | 455/343.3 |
| 6,865,609 B1 * | 3/2005 | Gubbi et al. | 709/230 |
| 2003/0086381 A1 * | 5/2003 | Terry et al. | 370/280 |
| 2003/0088778 A1 | 5/2003 | Lindqvist et al. | 713/182 |
| 2003/0152107 A1 | 8/2003 | Pekonen | 370/473 |
| 2003/0166392 A1 | 9/2003 | Laiho et al. | 455/3.06 |
| 2004/0190467 A1 * | 9/2004 | Liu et al. | 370/311 |

FOREIGN PATENT DOCUMENTS

| | | |
|---|---|---|
| EP | 0 944 275 A2 | 9/1999 |
| EP | 1 178 684 A2 | 2/2002 |
| WO | WO 2004/066652 A1 | 8/2004 |
| WO | WO 2004/079982 A1 | 9/2004 |

* cited by examiner

*Primary Examiner* — Marcos Batista
(74) *Attorney, Agent, or Firm* — Harrington & Smith

(57) ABSTRACT

Service component files are received at an input (11) from one or more service operators. An encapsulation and multiplexing system (12) organizes service components (20-23, see FIG. 2) relating to a service sequentially in a burst. In a burst, the service components include content data of different data types. A timing data subsystem (14) produces data from which a receiver can determine the times of datacast of the service components within a burst. Metadata dependent on the data type of each service component is organized, separately from the content data, by a component analyser (15). The metadata can identify a class of receiver having the capability to decode the corresponding service component, or can identify the data type of the corresponding service component, or it identifies the corresponding service component using a unique identifier. The service components, the metadata and the timing data is datacast by a transmitter station (13) for reception by receiver terminals. The metadata can be datacast as part of the corresponding service component, for example in a header thereof, or on a different bearer to the service components.

27 Claims, 3 Drawing Sheets

DATACAST SERVICES

TECHNICAL FIELD

This invention relates to a mobile terminal and to a method of operating a mobile terminal. The invention relates also to datacasting apparatus and to a method of datacasting.

BACKGROUND

Much has been written about the incorporation of digital broadcasting receivers into mobile handheld terminals, such as mobile telephones, personal digital assistants (PDAs), laptop computers and the like.

A system has been proposed in which data services are transmitted on a time-sliced, or time-multiplexed, basis allowing plural services to be transmitted at a given channel frequency. This has advantages for mobile terminals since their receivers only need to be powered and they only need to buffer, decode and process received data when data relating to the service of interest is being broadcast, and can be switched off at other times. This would normally result in a receiver being switched on for a relatively short period at regular intervals.

The present invention aims to provide a mechanism whereby the power consumption of data broadcast receivers can be further reduced.

SUMMARY

A first aspect of the invention provides a receiver terminal suitable for operating in a system in which plural service components of a service are datacast sequentially within a burst, the terminal being arranged to detect which of the service components are required to be received, and to enable a receiver in the terminal to receive signals at one or more times in a burst period corresponding to the required service components, and to disable the receiver for substantially the remainder of the burst period.

Typically, the terminal will arranged to enable and disable the receiver on the basis of received timing information identifying the timing of transmission of service components, although it may instead be able to derive timing information from the service components themselves.

In one embodiment the terminal is arranged to detect which of the service components are required to be received on the basis of a comparison of receiver capability information and received service component data type information. Here, the terminal can be arranged to source the service component data type information on the basis of a received service component identifier.

In another embodiment the terminal is arranged to detect which of the service components are required to be received on the basis of a comparison of receiver to classification information and received service component classification information. The service component classification information can relate merely to a level, e.g. high, medium or low capability, or may be more specific as to receiver requirements, for example requiring more than a specified amount of ROM or RAM or specific display or decoding characteristics. Regardless of what the service component classification information relates to, the terminal can be arranged to source the received service component classification information on the basis of a received service component identifier.

Sourcing any of the above mentioned information on the basis of a received service component identifier allows for simple datacasting, and allows complexity to be built into the receiver terminal only if it is required, with receiver terminals not arranged as above being able easily to ignore the received service component identifier.

The receiver classification information might be determined by a setting of the terminal. In this case, the classification setting can be automatically adjustable in dependence on one or more terminal parameters. The setting may alternatively or additionally be adjustable manually. In any case, adjustment of the receiver classification setting may be upwards or downwards.

In one embodiment the terminal is arranged to notify characteristics of the terminal to a remote station. In any case, the terminal may be arranged to notify a service being consumed to a or the remote station.

The receiver terminal might be a mobile, handheld terminal, but this is not critical to the invention, although mobile terminals clearly have certain advantages.

According to a second aspect of the invention, there is provided a method of operating a mobile terminal in a system in which plural components of a service are datacast sequentially within a burst, the method comprising: detecting which of the service components are required to be received; and allowing signals to be received and processed at one or more times in a burst period corresponding to the required components, and disallowing signal reception and processing for substantially the remainder of the time in the burst period.

According to a third aspect of the invention, there is provided datacast apparatus comprising: a sequencer arranged to organise service components relating to a service sequentially in a burst, different service components within a burst including content data of different data types; a metadata handler arranged to organise, separately from the content data, metadata dependent on the data type of each service component; a timing data handler arranged to organise timing data from which a receiver terminal can determine the times of datacast of the service components within a burst; and a datacaster arranged to datacast the service components, the metadata and the timing data.

The metadata can identify a class of receiver, or alternatively the metadata can identify the data type of the corresponding service component, for example.

Whether or not the metadata identifies such a class or data type, the metadata can identify the corresponding service component. This can allow a receiver terminal to determine the data type or classification using another data source, for example a webpage of a datacast operator if this is required. The data type or classification information may instead be sourced from another suitable information source.

The metadata can be datacast as part of the corresponding service component, for example as part of a header thereof. This is advantageous since it does not require receiver terminals to receive data transmitted on other bearers. However, in some embodiments the metadata can instead be datacast on a different bearer to the service components.

In any case, the metadata may be datacast as part of a PSI/SI table, or it may take any other suitable form.

In one embodiment the sequencer may be constructed to arrange the service components relating to a service in an order dependent on a perceived priority. In this case, service components having a higher priority can be grouped together, and services having a lower priority can be arranged before and/or after the service components having a higher priority. Alternatively or additionally, service components can be arranged in an ascending or descending priority order.

The datacasting apparatus might be arranged to use received data identifying the characteristics of one or more receivers associated with a service to determine the priority of the service components relating to that service.

A fourth aspect of the invention provides a method of datacasting, comprising: datacasting service components relating to a service sequentially within a burst the service components including content data of different data types; datacasting, separately from the content data, metadata dependent on the data type of each service component; and datacasting data from which a receiver terminal can determine the times of datacast of the service components within a burst.

The term 'datacasting' will be understood to mean the broadcasting or multicasting of data, and the term 'datacast' will be interpreted accordingly.

BRIEF DESCRIPTION OF THE DRAWINGS

Embodiments of the invention will now be described, by way of example only, with reference to the accompanying drawings, of which.

DETAILED DESCRIPTION

Figure 1:
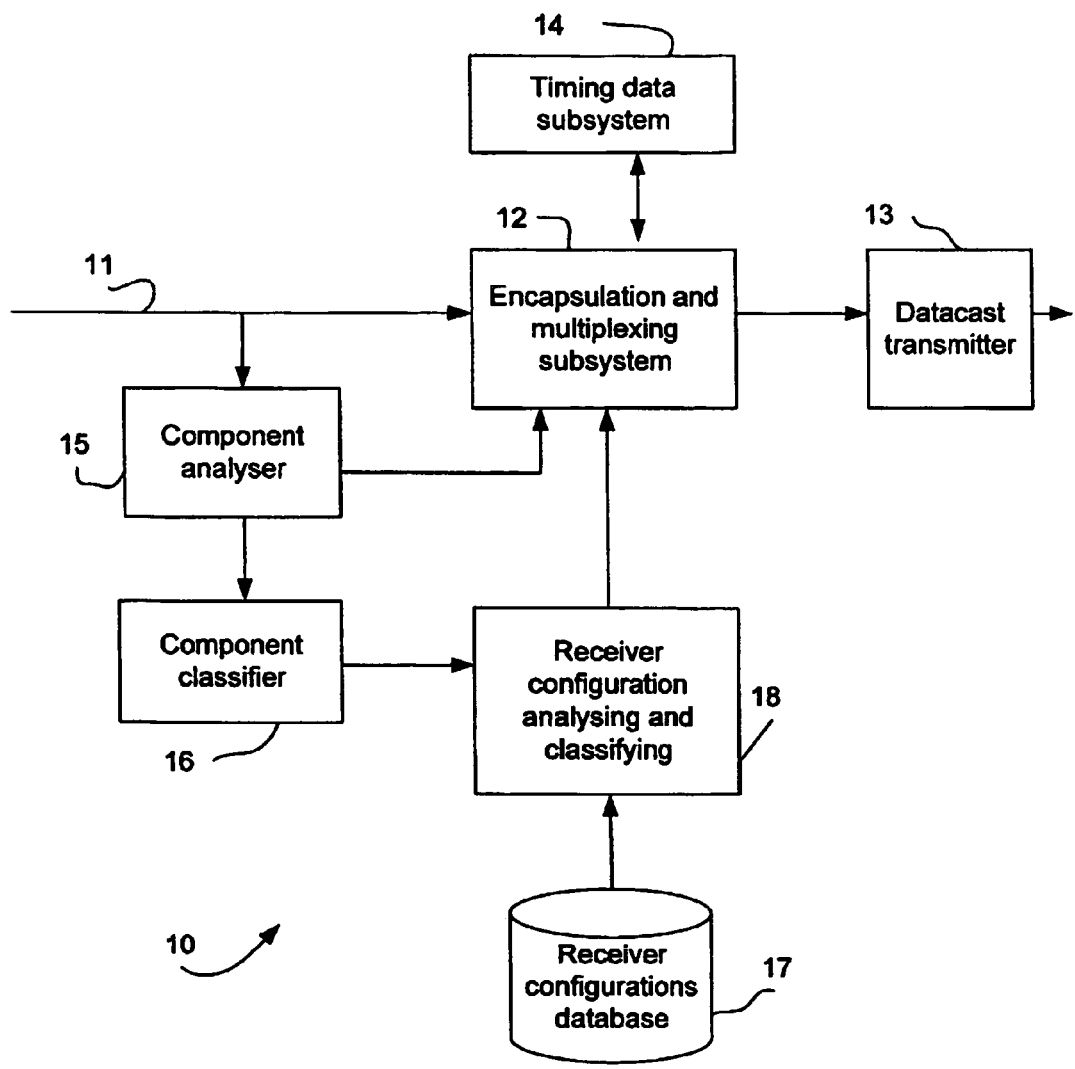
FIG. 1 is a schematic illustration of the components of a data broadcasting station according to certain aspects of the invention.

Referring to FIG. 1, datacast apparatus 10 is illustrated in schematic form. The datacast apparatus 10 in this example is configured to provide data suitable for broadcast or multicast over a DVB-T (terrestrial digital video broadcasting or DVB-H (hand held DVB) link. However, the datacast apparatus 10 may alternatively relate to any other kind of datacasting system. The datacast apparatus 10 includes generally an input 11 over which service component files are received from one or more service operators, an encapsulation and multiplexing device 12 and a broadcast transmitter 13. In the illustrated example the broadcast transmitter 13 is shown as forming part of the same apparatus, i.e., is at the same physical location, as the encapsulation and multiplexing system 12, but in other embodiments the components 12 and 13 may be located within separate hardware devices, which may be local to each other or remote from each other. The datacasting apparatus 10 further includes a timing data subsystem 14, which is connected to be in bi-directional communication with the encapsulation and multiplexing system 12. The datacast transmitter 13 receives data from the encapsulation and multiplexing system 12 and modulates it onto a radio frequency carrier before transmission in accordance with the relevant DVB standards.

Put simply, the datacasting apparatus 10 is arranged to receive service component files relating to plural services, to arrange service components relating to a given service sequentially in a data stream, to provide each of the service components with an appropriate header if one is not already present, to multiplex the different services together, to provide the services and service components with appropriate timing data, and datacast the resulting data for reception by receiver terminals within the range of the transmitter station 13. There are a number of ways of achieving this, some of which are described in more detail below.

Figure 2:
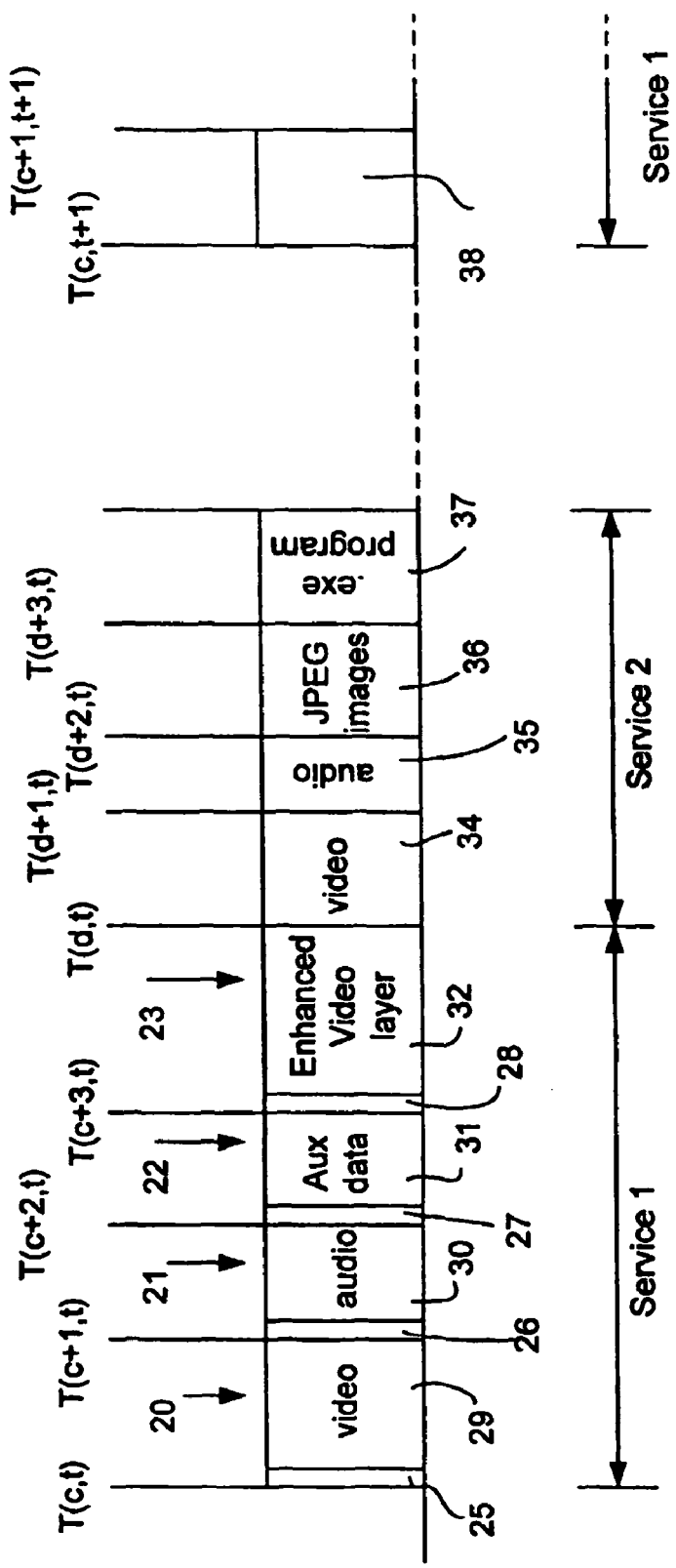
FIG. 2 is a diagram schematically illustrating a signal provided by the FIG. 1 station.

A signal datacast by the FIG. 1 apparatus is illustrated in FIG. 2. Here, the horizontal axis is linear and represents the progression of time. In respect of a first service (marked 'service 1') first to fourth service components 20 to 23 are transmitted sequentially. The service components 20 to 23 have transmission periods of various lengths in this example, although this is not critical. The first service component 20 begins transmitting at a time $T(c,t)$ and the fourth component 23 begins transmission at time $T(c+3,t)$, with the second and third service components 21 and 22 having transmission start times at $T(c+1,t)$ and $T(c+2,t)$ respectively. Each of the service components 20 to 23 includes a content payload and a header. The header sections for the service components 20 to 23 are illustrated at 25 to 28 respectively, and the payload sections are indicated at 29 to 32 respectively. In this example, the first service component 20 comprises video data, the second service component 21 comprises audio data, the third service component 22 comprises auxiliary data and the fourth service component 23 comprises data constituting an enhanced video layer.

In respect of a second service (marked as 'Service 2'), first to fourth service components 34 to 37 are illustrated. Although not shown, each of the service components 34 to 37 also has a header section and a content payload section. Here, the first and second service components 34 and 35 are video and audio data service components respectively, the third service component 36 contains JPEG image data and the fourth service component 37 comprises a part of an executable program file.

Following the first to fourth service components 34 to 37 of the second service, there may be service components in respect of one or more further services (not shown) before a time $T(c,t+1)$ at which a first service component 38 is transmitted in respect of a second burst and in connection with the first service. The interval between the time $T(c,t)$ at which the first service component of the first service of the first burst is begun to be transmitted at the corresponding time $T(c,t+1)$ in the next burst is known as the burst period. In IPDC (Internet Protocol datacasting) for DVB-T or DVB-H, the burst period is substantially constant, although this may not be the case for other datacasting systems.

Furthermore, the transmission length of the service components 20 to 23 of the first service may be the same for each of the burst. However, the transmission duration of the service components can be varied between bursts if this is required.

In this embodiment, the headers 25 to 28 each include metadata which describes the type of data in the corresponding payload content section 29 to 32 of the service component 20 to 23. Also datacast is timing data which identifies the start time of each of the service components 20 to 23 and 34 to 37 forming part of the IPDC services. This timing data may be transmitted in any suitable way, for example in the header or in the payload of the service components, or separately to the service components, for example as part of the PSI/SI data table associated with the IPDC transmissions. The timing data can be included in a header at any level in the system, for example a burst header, a packet header or the illustrated service component header. This timing data may take any suitable form. For example, it might identify in absolute terms the start time of the transmission of a service component in one burst and identify the inter-burst interval, allowing the start times of the corresponding service components in successive bursts to be unambiguously calculated. Alternatively, the start time of the transmission data corresponding to the service components may be stated relevant to any time which is known to the transmitter station 13 and which can be identified by a receiver station. The exact way in which the start times of the transmissions of the service components elements is calculated by a receiver station is not critical to the invention so is not described in detail here.

The timing data is used along with the metadata included in the headers 25 to 28 by a receiving terminal in order to switch on its receiver only at times in a burst period when required service components are incident, and to disable the receiver for substantially the remainder of the burst period, as will now be described with reference to FIG. 3.

A terminal 39 is shown schematically in the form of a combined mobile telephone handset and DVB-T receiver. Since the terminal 39 includes a receiver it can be termed a receiver terminal.

In one embodiment, the receiver terminal 39 includes first and second antennas 40, 41, which are connected to a DVB-T receiver 42 and a mobile telephone transceiver 43 respectively. The receiver 42 and the transceiver 43 each include RF signal processing circuits (not shown) for amplifying and demodulating received signals and one or more processors (not shown) for channel decoding and demultiplexing.

The receiver terminal 39 also includes a controller 44, a user interface 45, one or more memories 46, a coder/decoder (codec) 49, a speaker 50 with a corresponding amplifier 51 and a microphone 52 with a corresponding pre-amplifier 53. The receiver 42 and the transceiver 43 operate under control of the controller 44.

The user interface 45 includes a display 53 and a keypad 55. The display 53 is adapted for displaying images and video by, for instance being larger and/or having greater resolution than a display of a conventional mobile telephone and being capable of presenting colour images. The receiver terminal 39 also includes a power source in the form of e.g. a rechargeable battery 56, to provide DC power.

The controller 44 manages operation of the receiver terminal 39 under the direction of software (not shown) stored in one of the memories 46. The controller 44 provides output signals for the display 53 and receives and processes inputs from the keypad 55.

In another embodiment, the receiver terminal 39 is modified by providing a single receiver adapted to receive signals from the DVB-T network and mobile telephone networks and a transmitter adapted to transmit signals on the mobile telephone network (not shown). In a further embodiment, a single transceiver is provided for both communication over both networks.

The controller 44 is arranged to extract the metadata identifying the service components data type from the header 25 to 28, and to isolate the timing data, which is discussed above. The controller 44 uses knowledge of the capabilities and configuration of the mobile terminal 39 to determine which of the services components 20 to 23 are required to be received. This may be carried out in any suitable manner. For example, the controller 44, knowing that the resolution of the display 53 is not sufficient for high definition video presentation to be noticeably better than normal video presentation, may determine that the enhanced video layer service component 23 is not required. In this example, the controller 44 also uses to knowledge that the receiver terminal 39 is not provided with software enabling the provision of multi-language subtitles, to make a determination that the third service component 22 carrying multi-language subtitles is not required to be received. The controller 44 in this instance decides that the first and second service components 20 and 21 are required to be received, because the mobile terminal 39 has the capability to utilise the video and audio data from the content payloads 29 and 30.

Following determination of which service components are required to be received, the controller 44 controls the DVB-T receiver 42 to be switched on to receive data between the times T(c,t) and T(c+2,t) and also during the corresponding points in time in successive burst periods. The controller 44 controls the DVB-T receiver to be switched off for other times in the burst periods and accordingly also does not perform data buffering or processing. In this way, the DVB-T receiver 42 is switched on only when data relating to the required service components are incident on the antenna 40, and is disabled at all other times. This means that power from the rechargeable battery 56 is used to receive and process the required service components 20, 21 and is not used to receive and process the service components 22 and 23 which are not required.

In an alternative embodiment, the receiver terminal 39 is provided in a form of a personal digital assistant (PDA), and will now be described, again with reference to FIG. 3. The PDA 39 has all of the components of the mobile terminal of FIG. 3, although here the keypad 55 may be provided instead by way of a touch screen and stylus input, and the display 53 has considerably larger dimensions than the corresponding display of the mobile telephone.

On receiving the signal shown in FIG. 2, the PDA 39 determines that the first and second service components 20 and 21 are required to be received, as with the mobile telephone embodiment described above. However, the PDA 39 determines also that the display 53 is sufficient for it to be worthwhile to utilise the payload content 32 of the enhanced video layer service component 23. The controller 44 determines that the PDA 39 does not have the software to utilise effectively the auxiliary data payload content 31 of the third service component 22.

Using this determination of which of the service components are required to be received, the controller 44 controls the DVB-T receiver 42 to receive the first, second and fourth service components 20, 21 and 23 for each of the burst periods of the FIG. 2 signal. In this way, the DVB-T receiver 42 may be switched off when the third service component 22 is incident on the antenna 40, and power from the battery 56 is not unnecessarily spent receiving and processing the data forming part of the third service component 22. However, if the transmission duration of the third service component 22 is short, it might be convenient to keep the receiver switched on.

If the PDA 39 is not required to operate as a mobile telephone, the transceiver 43 and the antenna 41 may be omitted, along with, the microphone 52 and the amplifier 53. The loudspeaker 50 may also be omitted if the PDA is provided with a headphone jack instead, although this embodiment is not illustrated.

Figure 4:
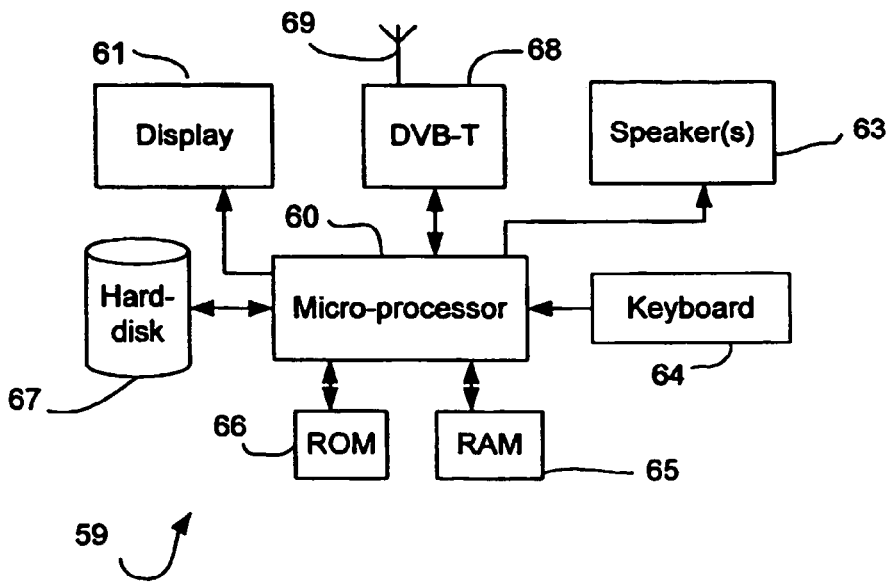

An alternative embodiment is illustrated in FIG. 4. Referring to this Figure, a laptop computer 59 is illustrated comprising generally a microprocessor 60, which is connected to each of a display 61, which could be a TFT display or any other type, one or more speakers 63, a keyboard 64, RAM 65, ROM 66 and a hard drive 67. The laptop computer 59 is mostly conventional, except that it is provided with a DVB-T or DVB-H receiver 68, which receives DVB datacast transmissions through an antenna 69. Also, the ROM 66 is provided with a program allowing the microprocessor 60 to effect suitable control of the DVB-T receiver 68 and to present audiovisual data using the display 61 and the speaker 63 under control of a user interface, which includes the keyboard 64 and the display 61.

Figure 3:
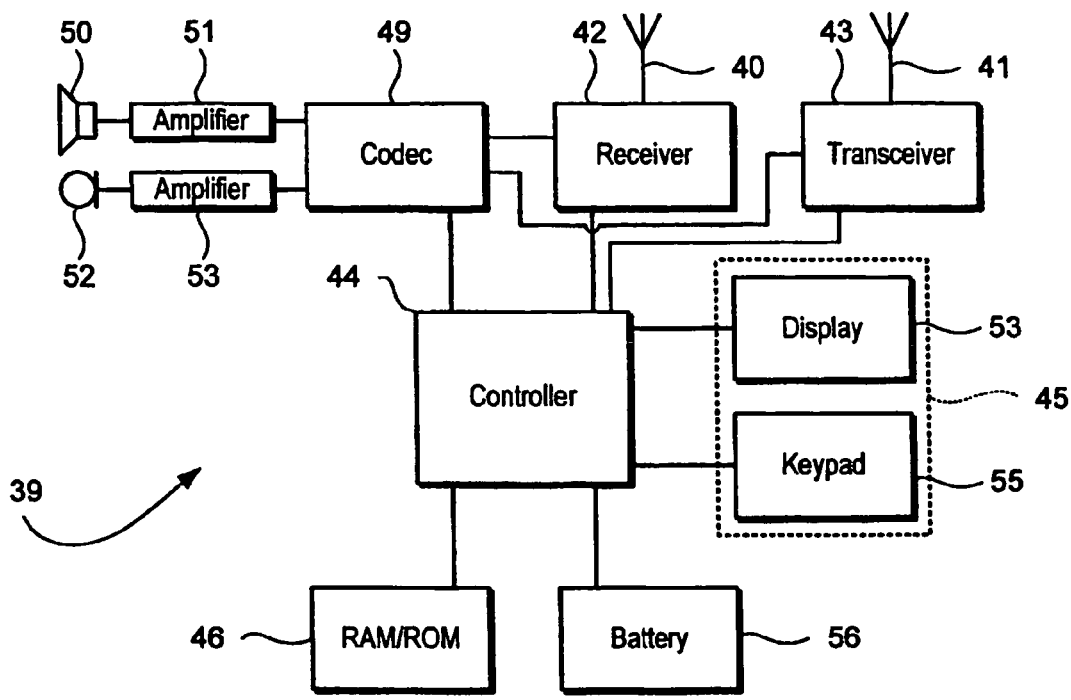
FIGS. 3 and 4 are schematic drawings of mobile receivers according to certain aspects of the invention.

In this embodiment, the microprocessor 60 operates similarly to the controller 44 of FIG. 3. In particular, the microprocessor 60 determines from the metadata included in the headers 25 to 28 and from its capabilities and configuration that each of the first to fourth service components 20 to 23 contains data which is required to be received and utilised by the laptop computer 60. Accordingly, the microprocessor 60 controls the DVB-T receiver 68 to receive and process signals received between the times T(c,t) and T(d,t) and between the corresponding times in successive burst periods. The microprocessor 60 is therefore provided with the payload contents data 29 to 32 from each of the first to fourth service components 20 to 23, and is able to utilise this in providing an output at the display 61 and the speaker(s) 63.

The mobile telephone or PDA 39 and the laptop computer 59 can determine what service components are required to be received on the basis of software and/or hardware capabilities. For instance, if a service component contains content payload data which is an MPEG4 file, MPEG4 decoding software is required in the mobile terminal 39, 59 in order to utilise the data. Accordingly, if the mobile terminal 39, 59 does not have MPEG4 decoding software, then the corresponding service component will be deemed to be not required and thus the receiver 42, 68 will be controlled by the controller 44, 60 not to be switched on during the transmission of that service component. Similarly, MP3 decoding software is required to decode MP3 files, and JPEG decoding software is required to decode JPEG files.

If a service component comprises part of a data file, the corresponding header of that service component then preferably includes metadata identifying the total size of the file. In this way, the receiver terminal 39, 59 can determine whether or not it has sufficient memory to store the entire file (which is transmitted over a series of bursts), and is arranged to receive service components relating to that data file only if sufficient memory is present. Such a situation may occur when the file is an executable programme file, for example, a game, or a document file such as a PDF file or a spreadsheet or a word processor file. In the event that the file is an executable programme, it is likely that a certain amount of RAM will be required to execute the program. In this case, the amount of RAM required to execute the program is included in the metadata as well as the size of the file, so that the receiver can determine whether or not it has the capabilities to execute the program.

In an alternative embodiment, the metadata does not identify directly the data type of the corresponding payload content data. Instead, the metadata may identify a class of receiver terminal which is required to consume the data. In a simple example, there may be three classes of receiver terminal capabilities, namely a limited receiver, a medium receiver and a high-end receiver. In this example, each receiver 39, 59 can be fed with data identifying the class to which it belongs. In order to be classified as a medium level receiver, a receiver must contain all of the software and hardware capabilities required to utilise the data which is classified by the IPDC operator into the medium class. Corresponding requirements apply to the high-end and limited receiver classes. On decoding the class information from the header of a received service component, the receiver terminal 39, 59 can compare this to the receiver classification in order to arrive at a determination as to whether the corresponding service component is required to be received and processed or not. If the receiver is classified as a limited receiver, it is arranged only to receive service components for which the header identifies that a limited receiver class is suitable. A medium class receiver is arranged to receive and process service components for medium and limited class receivers, and so on.

The receiver capabilities required to meet one of the classifications may be made available to the mobile terminal 39, 59 in any suitable manner. For example, the classification may be pre-programmed into the receiver terminal 39, 59 before sale. Alternatively, or in addition, the information could be datacast along with the transmitted content, or be datacast on another channel. Alternatively, this information could be available on a webpage operated by the operator of the datacasting apparatus 10. The information may be retrievable from another source in any suitable way, for example as an SMS or MMS reply to an MMS or SMS request to a telephone number designated by the operator. The exact mode of informing the mobile receiver 39, 59 of its classification or the requirements needed to be met to have a classification is not important to the invention.

If required, the classification of the receiver terminal may be made available to a user. This information may be available through a menu option, or alternatively it could be presented on the display 53, 61 when the receiver classification has been determined by the controller 44, 60. In one embodiment the classification of the mobile terminal 39, 59 can be changed. The classification may be changed by a user through the user interface provided on the receiver 39, 59. Alternatively, or in addition, the classification may be changed by the controller 44, 60. If, for example, it is determined that the remaining power resources of the mobile terminal 39, 59 are low, the controller 44, 60 may automatically downgrade the classification of the mobile terminal. Downgrading the classification in this way results in fewer service components being deemed relevant, and thus fewer service components are received and processed. This results in reduced power consumption, thereby increasing the amount of time before the power remaining is insufficient to allow the mobile receiver terminal 39, 59 to remain switched on.

The classification of the receiver terminal 39, 59 may be changed also if, for example, the amount of available ROM or RAM falls below a threshold, which results in the receiver terminal 39, 59 falling into a lower classification than previously experienced.

Similarly, in another embodiment the receiver terminal 39, 59 is operable to allow the classification to be upgraded. The classification may be upgraded if a hardware or software upgrade allows the receiver terminal 39, 59 to meet the requirements of a higher classification. Also, the PDA 39 may include many of the hardware and software capabilities which are required to be classified as a high-end receiver but be missing one or more essential capabilities so cannot be classified as a high-end receiver. However, this does not mean that the PDA 39 is unable to receive and consume the content of all service components which are classified as being usable by high-end receivers, merely that such cannot be guaranteed. Accordingly, allowing a user to upgrade manually the classification of a receiver terminal 39, 59 may mean that the user can be presented with content which the PDA 39 is able to consume but which is classified to a higher classification than that to which the PDA is entitled. Of course, if any received and processed service components contain data which the PDA 39 is not equipped to consume, then the PDA 39 will not be able to consume that data. In this case, the PDA 39 may inform the user of this, or alternatively this may be transparent to the user.

Furthermore, if the classification of the receiver terminal 39, 59 is above the most basic classification, the user may be provided with an option to select the desired classification. Allowing the classification to be selected by the user in this way is advantageous since it allows the user to influence the rate of power consumption, allowing him or her to choose between rich content and extended battery life. If the user has the option of selecting between three or more classification options, then this may allow the user to select between extremes of extended battery life and richness of content, and also one or more compromises.

Instead of, or as well as, the broadcast data including information which identifies a classification of receiver which is required to consume the content of the service component or data indicating the type of data within the service component, each service component may include a component identifier. Such an identifier needs to uniquely identify the service component from other service components which are not provided with classification information or data type metadata. A receiver terminal 39, 59 can use the component identifier to determine from an operator's web page, or from any other suitable information source, either the data type or the classification of receiver required to consume the corresponding service component.

The datacasting apparatus 10 is arranged to select an order for the service components within a timeslot relating to a service dependent on the actual or assumed characteristics of the receiver terminals which are receiving the service, as will now be described with reference to FIG. 1. Connected to receive the service component files from the input 11 and in parallel to the encapsulation and multiplexing system 12 is a component analyser 15. The component analyser 15 examines the data forming part of each of the service components received at the input 11 and determines therefrom the data type thereof. This may occur in any suitable manner. At one extreme, the component analyser 15 may apply the received data to plural software emulators, each emulating a different data consumption program, until one of the software emulators is found to produce usable content as its output. By determining which emulator has a satisfactory output, it can be determined what data type the corresponding service component is. At the other extreme, the component analyser 15 may simply read data forming part of the service component files or attached to the service component files which identifies in unambiguous terms the type of data in the corresponding service component. Any other scheme may be used instead.

If the service component files received at the input 11 of the datacasting apparatus 10 do not indicate the data type to which the service components relate, then the component analyser 15 is arranged to provide metadata indicating the data type of the service components. This metadata is used by the encapsulation and multiplexing system 12 to provide a header for each of the service components which identifies the data type of the corresponding service component. Of course, this is only carried out if it is required to provide the datacast service components 20 to 23 with data particularly identifying the data type of the corresponding service component, which is not true in all embodiments.

A component classifier 16 is connected to receive data from the component analyser 15. The component classifier 16 is arranged to determine on the basis of the metadata produced by the component analyser 15 what class of receiver terminal is required to consume the content of the corresponding service component. This information along with the metadata identifying the service component data type is passed from the component classifier 16 to a receiver configuration classifying and analysing module 18.

A receiver configurations database 17 is connected to receive configuration information from all of the receiver terminals which are consuming a service datacast by the datacasting apparatus 10 and which choose to notify their configurations to the apparatus. The database 17 is divided into a number of sections (not shown), one section for each of the services which are handled by the datacasting apparatus 10. The exact form of the receiver configuration data is not critical to the invention. In one example, it comprises information identifying the hardware and software capabilities of the receiver and an identification of the type of service (or services) which the corresponding receiver terminal is consuming. The level of detail provided concerning the hardware and software capabilities determines the amount of analysis processing which is required to be performed by the datacasting apparatus 10. The amount of detail also determines the quantity of data which needs to be transmitted from the receiver terminal 39, 59 to the datacasting apparatus 10. This is particularly important if the communication channel used is a mobile telephone network. GPRS is seen as a particularly convenient channel for the communication of this information, although it may be communicated instead by SMS, MMS or using any other suitable communication channel. To minimise the amount of data communicated, the receiver configuration data can be stored permanently in the database 17, and notification then is made by receiver terminals as to their identity and the service(s) that they are consuming. Changes in receiver configuration may also be notified.

The receiver configuration classifying and analysing module 18 uses data provided by the component classifier 16 and the receiver configurations database 17 to determine the most appropriate order for the service components. This is carried out for each of the services. The exact algorithm used to determine the most appropriate service component order is not critical to the invention. The resulting order is passed to the encapsulation and multiplexing system 12, which arranges the service components in the appropriate order.

If data type information is required to be provided in the datacast and this information is not provided with the service component files received at the input 11, it is provided by the component classifier 16 directly to the encapsulation and multiplexing system 12, where type data is included appropriately in the transport streams fed to the datacast transmitter 13.

The receiver terminals 39, 59 may be arranged to notify their configurations and/or services which they are consuming to the datacasting apparatus 10 in any suitable manner. For example, this may be triggered by the inclusion in a datacast signal of an instruction to notify, or it may be performed periodically or on any other suitable basis The notification of receiver characteristics and service consumption data may be transparent to the user. However, if notification incurs a cost to the user, for example, through utilisation of a chargeable mobile telephone channel, then the receiver terminal 39, 59 may require acknowledgement from the user before providing notification of receiver characteristics to the datacasting apparatus 10.

The receiver terminals 39, 59 may also subscribe to services or bundles of services using a mobile telephone network (not shown), for example, using WAP or SMS or MMS or any other suitable scheme.

It is not essential that the datacasting apparatus 10 has knowledge of the characteristics and capabilities of the receiver terminals which are consuming services. In the absence of this information, the apparatus 10 can estimate the likelihood of each service component being usable by the relevant receiver terminals. This can occur in any suitable manner.

The datacasting apparatus 10 preferably is arranged to organise the service components relating to a service in an order such that service elements which are consumable by fewer receiver terminals 39, 59 are positioned at the beginning or the end of the sequence, but not at both ends. This is advantageous since it maximises the probability that a receiver will be needed to be switched on and switched off only once during each burst period. In particular, a basic receiver may be able to consume only the first and second service components 20 and 21 relating to the first service shown in FIG. 2. Since these service components 20 and 21 are adjacent, the basic receiver terminal need only to switch on its receiver once during a burst period. The inclusion of the third service component 22 which is considered in this instance to be more likely to be consumable than the fourth service component 23, is placed adjacent to the second service component 21.

Thus, a medium classification receiver terminal, such as the PDA 39, described with reference to FIG. 3, can receive the first to third service components 20 to 22 and no other service components by switching on and switching off once within the burst interval. The fourth service component 23, which is deemed to be the least likely to be consumable by a receiver terminal 39, 59 is included at the periphery of the group of service components 20 to 23.

It will be appreciated that the service components which are most likely to be consumable by a receiver terminal are not in all embodiments of the invention included in the beginning of the sequence, since it is equally feasible that the order of the service components 20 to 23 could be reversed. In this case, a basic receiver would be switched on later than the switch-on time of a higher-end receiver, although the receivers would be switched off at the end of the same service component. Another alternative would be to include the service components which are most likely to be consumed in the middle of the timeslot allocated to a given service and to arrange the services less likely to be consumable by a receiver terminal before and after those more popular service components. This embodiment is particularly advantageous where there are service components which do not necessarily relate to different receiver classifications but which require different software and/or hardware for their consumption.

The service components within a service are ordered by the encapsulating multiplexing system 12 according to any of the above described schemes. It will be appreciated that the encapsulation and multiplexing system 12 also includes either data identifying the classification of each of the service components or alternatively the data type of the service components, as well as metadata identifying the transmission times of the service components, in the transport streams sent to the datacast transmitter 13. The timing data is provided by the timing data subsystem 14. This subsystem 14 receives from the encapsulation and multiplexing system 12 information identifying the sizes of the data files constituting the content payloads of the service components and information identifying the ordering of the service components within a time slot relating to a service, and calculates the timing data therefor. Data is passed in both directions between the metadata and timing data subsystem 14 and the encapsulation and multiplexing system 12. The resulting transport streams are passed from the encapsulation and multiplexing system 12 to the data transmitter 13.

The ordering of the service components within a timeslot relating to a given service may be dependent also on the size of the service component, i.e., dependent on the amount of data included in each of the service components. In particular, larger service components may receive a higher priority such that they are more likely to be transmitted earlier in a timeslot than later in a timeslot. However, it is preferred that the data type of the service components is taken into account as well as the size of the components in determining the order of transmission within a burst.

To maximise the ease of reception by a receiver terminal 39, 59, the order of the service components preferably is the same within the consecutive bursts. However, the order of the service components may vary between bursts in some circumstances.

Another example of a service component which may be usable by some receivers but not all receivers occurs when forward error correction (FEC) is used. For example, the data comprising the video and audio service components 20 and 21 of the first service shown in FIG. 2 may be subjected to MPE-FEC (multiprotocol encapsulation-FEC), and the resulting parity data provided as the fourth service components 23 in place of the enhanced video layer service component shown. Here, a special decoder, such as a Reed-Solomon decoder is required in the receiver terminals 39, 59 in order for error correction to be properly carried out. Accordingly, the FEC parity data service component 23 is usable by some but not all of the receiver terminals 39, 59 receiving and decoding this service. FEC decoding capability may be required for a receiver terminal 39, 59 to be classified as a high-end receiver, although it will be appreciated that this is not essential.

The above described embodiments are not intended to be limiting to the scope of protection conferred. For example, although the embodiments relate to a DVB-T broadcast/datacast network, the invention is not limited to such. The invention instead may be implemented using ISDB-T (Integrated Services Digital Broadcasting Terrestrial) or the US ATSC (Advanced Television Systems Committee) system, or any other kind of broadcast data system.

Also, although four service components are shown for each service, this is just an example, and any number of service components may be used instead. Different services may also have different numbers of service components.

In some embodiments described above, the relative order of the transmission of the service components and the timing data is included in the header of the service components, so can be considered to be inband with the signalling of the bearer. However, this information could be provided out of band, for example, by the inclusion of appropriate information in a PSI/SI table or any other suitable way. In this instance, it is not necessary to provide headers in the manner described above, although it is necessary instead to ensure that the appropriate information is made available to the receiver terminals requiring a service. Alternatively, the relative order of the service components could be transmitted in the header(s) and the timing data transmitted separately, or vice versa.

The invention claimed is:

1. An apparatus comprising:
   at least one processor; and
   at least one memory including computer program code, where the at least one memory and the computer program code are configured, with the at least one processor, to cause the apparatus to at least:
   store receiver capability information relating to capabilities of a receiver terminal;
   receive plural service components of one or more services that are datacast sequentially within a burst;
   determine, on a basis of a comparison of the receiver capability information and received service component information, which service components of the plural service components of the one or more services are required service components;
   determine, on a basis of the comparison of the receiver capability information and the received service component information, service components that are not required to be received;

receive timing information, where the timing information is identifying a timing of transmission of each of the required service components and a timing of transmission of each of the service components that are not required to be received; and based on the received timing information, to one of enable the receiver to receive signals at one or more times in a burst period corresponding to the required service components, and to disable the receiver at one or more times in the burst period corresponding to the service components that are not required to be received.

2. The apparatus as claimed in claim 1, in which the received service component information comprises received service component data type information.

3. The apparatus as claimed in claim 2, where the apparatus is caused to source the received service component data type information on the basis of a received service component identifier.

4. The apparatus as claimed in claim 1, in which the receiver capability information comprises receiver classification information, and in which the received service component information comprises received service component classification information.

5. The apparatus as claimed in claim 4, where the apparatus is caused to source the received service component classification information on a basis of a received service component identifier.

6. The apparatus as claimed in claim 4, in which the receiver classification information is determined by a setting of the apparatus.

7. The apparatus as claimed in claim 6, in which the classification setting is automatically adjustable in dependence on one or more apparatus parameters.

8. The apparatus as claimed in claim 1, where the apparatus is caused to notify characteristics of the apparatus to a remote station.

9. The apparatus as claimed in claim 1, where the apparatus is caused to notify a remote station of a service being consumed.

10. The apparatus of claim 1 wherein the apparatus is embodied in a mobile receiver terminal.

11. A method comprising:
storing in a memory, receiver capability information relating to capabilities of a receiver terminal;
receiving, with a receiver, timing information identifying a timing of a transmission of plural service components of one or more services, where the plural service components of each of the one or more services are being datacast sequentially within a burst;
determining with a controller, on a basis of a comparison of the receiver capability information and received service component information, which service components of the plural service components of the one or more services are required to be received;
determining, on a basis of the comparison of the receiver capability information and the received service component information, which service components of the plural service components that are not required to be received, where the timing information is identifying a timing of transmission of each of the required service components and a timing of transmission of each of the service components that are not required to be received; and
based on the received timing information, performing, with the controller, one of allowing signals to be received and processed at one or more times in a burst period corresponding to the required service components, and disallowing signal reception and processing at one or more times in the burst period corresponding to service components that are not required to be received.

12. A method as claimed in claim 11, wherein the received service component information comprises received service component data type information.

13. A method as claimed in claim 12, comprising using a service component identifier to source the received service component data type information.

14. A method as claimed in claim 11, wherein the receiver capability information comprises receiver classification information and wherein the received service component information comprises received service component classification information.

15. A method as claimed in claim 14, comprising using a service component identifier to source the received service component classification information.

16. A method as claimed in claim 14, in which the receiver classification information is determined by a setting of a mobile receiver terminal.

17. A method as claimed in claim 16, comprising automatically adjusting the classification setting in dependence on a sensing of a change in one or more terminal parameters.

18. The method of claim 11 performed in a mobile receiver terminal.

19. A method as claimed in claim 11, comprising notifying a service being consumed to a remote location.

20. A method as claimed in claim 18, comprising notifying characteristics of the mobile receiver terminal to a remote location.

21. A computer readable memory encoded with a computer program executable by a processor to perform actions comprising:
storing receiver capability information relating to capabilities of a receiver terminal;
receiving timing information, where the timing information is identifying a timing of a transmission of plural service components of one or more services, where the plural service components of each of the one or more services are being datacast sequentially within a burst;
determining, on a basis of a comparison of the receiver capability information and received service component information, which service components of the plural service components of one or more services are required to be received;
determining, on a basis of the comparison of the receiver capability information and the received service component information, service components of the plural service components that are not required to be received, where the timing information is identifying a timing of transmission of each of the required service components and a timing of transmission of each of the service components that are not required to be received; and
based on the received timing information, performing one of allowing signals to be received and processed at one or more times in a burst period corresponding to the required components, and disallowing signal reception and processing at one or more times in the burst period corresponding to service components that are not required to be received.

22. The computer readable memory encoded with a computer program as claimed in claim 21, wherein the received service component information comprises received service component data type information.

23. The computer readable memory encoded with a computer program as claimed in claim 22, comprising using a service component identifier to source the received service component data type information.

24. The computer readable memory encoded with a computer program as claimed in claim 21, wherein the receiver capability information comprises receiver classification information and wherein the received service component information comprises received service component classification information.

25. The computer readable memory encoded with a computer program as claimed in claim 24, comprising using a service component identifier to source the received service component classification information.

26. The computer readable memory encoded with a computer program as claimed in claim 25, comprising automatically adjusting the classification setting in dependence on a sensing of a change in one or more terminal parameters.

27. The computer readable memory encoded with a computer program as claimed in claim 21 embodied in a mobile receiver terminal.

* * * * *